(12) United States Patent
Lin et al.

(10) Patent No.: US 12,535,619 B2
(45) Date of Patent: Jan. 27, 2026

(54) SURFACE-MODIFIED CONTACT LENS, METHOD OF PREPARING THE SAME, AND METHOD OF MODIFYING SURFACE OF POLYMERIC MATERIAL

(71) Applicant: National Yang Ming Chiao Tung University, Hsinchu (TW)

(72) Inventors: Hsin-Chieh Lin, Hsinchu (TW); Ting-Yu Su, Hsinchu (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 740 days.

(21) Appl. No.: 17/382,374

(22) Filed: Jul. 22, 2021

(65) Prior Publication Data

US 2022/0026601 A1    Jan. 27, 2022

Related U.S. Application Data

(60) Provisional application No. 63/160,946, filed on Mar. 15, 2021, provisional application No. 63/054,803, filed on Jul. 22, 2020.

(51) Int. Cl.
*G02B 1/04* (2006.01)

(52) U.S. Cl.
CPC .................................. *G02B 1/043* (2013.01)

(58) Field of Classification Search
None
See application file for complete search history.

(56) References Cited

U.S. PATENT DOCUMENTS

| | | | |
|---|---|---|---|
| 8,044,112 B2 | 10/2011 | Matsuzawa | |
| 8,529,057 B2 | 9/2013 | Qiu et al. | |
| 8,944,592 B2 | 2/2015 | Qiu et al. | |
| 9,052,442 B2 | 6/2015 | Pruitt et al. | |
| 9,239,409 B2 | 1/2016 | Qiu et al. | |
| 9,310,627 B2 | 4/2016 | Havenstrite et al. | |
| 9,507,173 B2 | 11/2016 | Qiu et al. | |
| 9,738,813 B2 | 8/2017 | Qiu et al. | |
| 10,308,835 B2 | 6/2019 | Qiu et al. | |

(Continued)

FOREIGN PATENT DOCUMENTS

| | | |
|---|---|---|
| AU | 2015360637 B2 | 8/2019 |
| TW | 201435428 A | 9/2014 |

(Continued)

OTHER PUBLICATIONS

Lina Xu et al.,"Anti-biofouling contact lenses bearing surface-immobilized layers of zwitterionic polymer by one-step modification", RSC Advances, 2014, 4, pp. 15030-15035.

(Continued)

*Primary Examiner* — William R Alexander
*Assistant Examiner* — Mackenzi Waddell
(74) *Attorney, Agent, or Firm* — CKC & Partners Co., LLC

(57) ABSTRACT

The disclosure provides a surface-modified contact lens including a lens body, a first modification layer inside the lens body, and a second modification layer on a surface of the lens body, in which the first modification layer and the second modification layer are connected through the surface, the first modification layer and the second modification layer comprises a hydrophilic polymer, and a thickness of the first modification layer from the surface of the lens body is in a range of 1 nm to 100 nm.

8 Claims, 5 Drawing Sheets

(56) References Cited

U.S. PATENT DOCUMENTS

| | | |
|---|---|---|
| 10,371,965 B2 | 8/2019 | Lee et al. |
| 10,525,170 B2 | 1/2020 | Havenstrite et al. |
| 2007/0066706 A1* | 3/2007 | Manesis .............. G02B 1/043 523/106 |
| 2007/0229758 A1* | 10/2007 | Matsuzawa .......... C08J 7/0427 351/159.62 |
| 2012/0026458 A1* | 2/2012 | Qiu .............. B29D 11/00067 427/164 |
| 2014/0055741 A1* | 2/2014 | Havenstrite .......... G02B 1/043 427/535 |
| 2015/0234204 A1* | 8/2015 | Havenstrite .......... G02B 1/043 351/159.33 |
| 2017/0242269 A1* | 8/2017 | Havenstrite .......... G02B 1/043 |
| 2021/0132411 A1* | 5/2021 | Qiu .............. B29D 11/00048 |

FOREIGN PATENT DOCUMENTS

| | | |
|---|---|---|
| TW | I594041 B | 8/2017 |
| WO | 2016094533 A1 | 6/2016 |

OTHER PUBLICATIONS

Mohammad Kazemi Ashtiani et al., "Chitosan surface modified hydrogel as a therapeutic contact lens", Polymers Advanced Technologies, 2019, 8 pages.

Xudong Deng et al.,""Click" Chemistry-Tethered Hyaluronic Acid-Based Contact Lens Coatings Improve Lens Wettability and Lower Protein Adsorption", ACS Applied Materials & Interfaces, 2016, 8, pp. 22064-22073.

Jun-Pil Jee et al., "Development of Hydrogel Lenses with Surface-immobilized PEG Layers to Reduce Protein Adsorption", Bulletin of Korean Chemical Society, 2015, vol. 36, pp. 2682-2687.

Hwa-Lim Lim et al., "Development of Hydrogel Lenses Functionalized with an Interpenetrating Chitosan Network for Reduction of Protein Adsorption", Journal of Nanoscience and Nanotechnology, vol. 16, 2016, pp. 11952-11956.

Mohammad Kazemi Ashtiani et al., "Surface modification of poly(2-hydroxyethyl methacrylate) hydrogel for contact lens application", Polymers Advanced Technologies, 2018, 29, pp. 1227-1233.

\* cited by examiner

SURFACE-MODIFIED CONTACT LENS, METHOD OF PREPARING THE SAME, AND METHOD OF MODIFYING SURFACE OF POLYMERIC MATERIAL

CROSS-REFERENCE TO RELATED APPLICATION

This application claims priority to U.S. Provisional Application Ser. No. 63/054,803, filed Jul. 22, 2020, which is herein incorporated by reference in its entirety.

BACKGROUND

Field of Invention

The present disclosure relates to a surface-modified contact lens, a method of preparing the surface-modified contact lens, and a method of modifying a surface of a polymeric material.

Description of Related Art

With the increasing popularity of contact lenses, the contact lenses wearers have paid more and more attention on the comfort of contact lenses. Many factors affect the comfort of wearing contact lenses. The clinically important factors include lens hydrophilicity, oxygen permeability, surface wettability, and lens lubricity. Recently, some surface modification methods of the contact lenses have been developed for improving the mentioned factors. However, the deformation of the contact lenses which affects the comfort and the function of the contact lenses may occur during the surface modification process. Therefore, when enhancing the clinical factors, the deformation of the contact lenses should also be taken into account.

SUMMARY

The disclosure provides a surface-modified contact lens including a lens body, a first modification layer inside the lens body, and a second modification layer on a surface of the lens body, in which the first modification layer and the second modification layer are connected through the surface, the first modification layer and the second modification layer comprises a hydrophilic polymer, and a thickness of the first modification layer from the surface of the lens body is in a range of 1 nm to 100 nm.

In some embodiments of the disclosure, the lens body includes silicone hydrogel, poly(2-hydroxyethyl methacrylate), or polyurethane.

In some embodiments of the disclosure, a thickness of the second modification layer from the surface of the lens body is in a range of 1 nm to 100 μm.

In some embodiments of the disclosure, the second modification layer covers a front surface, a back surface, or both the front surface and the back surface of the lens body.

In some embodiments of the disclosure, a dynamic contact angle of the surface-modified contact lens is in a range of 0° to 25°.

In some embodiments of the disclosure, a static contact angle of the surface-modified contact lens is in a range of 0° to 40°.

In some embodiments of the disclosure, the hydrophilic polymer further includes a medicinal structure.

The disclosure provides a method of preparing a surface-modified contact lens. The method includes immersing a lens body in a first solution comprising an organic free radical initiator having a charged structure or a hydrogen-bond donor, in which the organic free radical initiator is absorbed by the lens body. The method further includes transferring the lens body into a second solution comprising a hydrophilic monomer and reacting the organic free radical initiator with the hydrophilic monomer to form a first modification layer inside the lens body and a second modification layer on a surface of the lens body, in which the first modification layer and the second modification layer are connected through the surface.

In some embodiments of the disclosure, the organic free radical initiator in the first solution is in a range of 0.1 wt % to 20 wt %.

In some embodiments of the disclosure, the organic free radical initiator in the first solution includes a functional group of azo or hydroxyl ketone.

In some embodiments of the disclosure, the organic free radical initiator in the first solution includes 2,2'-Azobis(2-methylpropionamidine) dihydrochloride, 4,4'-Azobis(4-cyanovaleric acid), 2,2'-Azobisisobutyric acid, 2,2'-Azobisisobutyric acid, 2,2'-Azobis[2-methyl-N-(2-hydroxyethyl)propionamide], 2-Hydroxy-4'(2-hydroxyethoxy)-2-methylpropiophenone, 1-Hydroxy-Cyclohexylphenyl-ketone, 2-Hydroxy-2-methylpropiophenone (HMPP), or combinations thereof.

In some embodiments of the disclosure, the hydrophilic monomer in the second solution is in a range of 0.01 wt % to 30 wt %.

In some embodiments of the disclosure, a molecular weight of the hydrophilic monomer is in a range of 40 to 800 daltons.

In some embodiments of the disclosure, the hydrophilic monomer in the second solution includes N,N-dimethylacrylamide, hydroxyethyl methacrylate, 2-methacryloyloxyethyl phosphorylcholine, acrylamide, glycerol methacrylate, hydroxypropyl methacrylate, sulfobetaine methacrylate, or combinations thereof.

In some embodiments of the disclosure, the second solution further includes a second monomer having a medicinal structure.

In some embodiments of the disclosure, reacting the organic free radical initiator with the hydrophilic monomer includes heating or irradiating the second solution with the lens body.

In some embodiments of the disclosure, heating the second solution with the lens body includes heating the second solution to a temperature between 30° C. and 140° C.

In some embodiments of the disclosure, irradiating the second solution with the lens body includes irradiating the second solution with a wavelength between 190 nm and 650 nm.

In some embodiments of the disclosure, the first solution and the second solution are aqueous solutions.

The disclosure provides a method of modifying a surface of a polymeric material. The method includes immersing the polymeric material in a first solution comprising an organic free radical initiator having a charged structure or a hydrogen-bond donor, in which the organic free radical initiator is absorbed by the polymeric material. The method further includes transferring the polymeric material into a second solution comprising a hydrophilic monomer and reacting the organic free radical initiator with the hydrophilic monomer to form a first modification layer inside the polymeric material and a second modification layer on the surface of the polymeric material, in which the first modification layer and the second modification layer are connected through the surface.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows. Aspects of the present disclosure are best understood from the following detailed description when read with the accompanying figures. It is noted that, in accordance with the standard practice in the industry, various features are not drawn to scale.

DETAILED DESCRIPTION

Figure 1A:
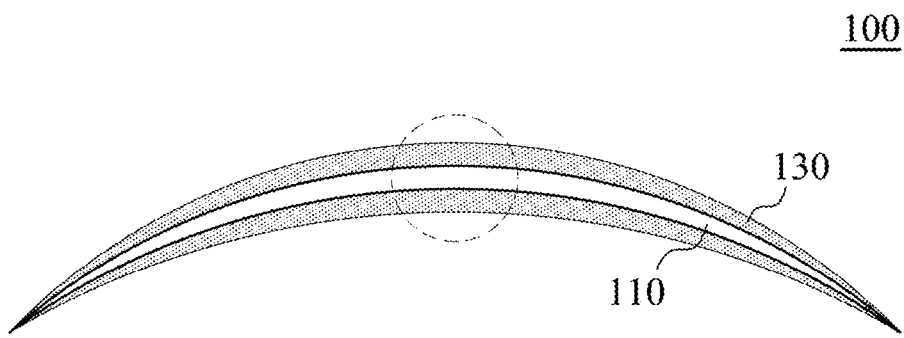
FIG. 1A is a schematic cross-sectional view of the surface-modified contact lens according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The present disclosure provides a surface-modified contact lens including a lens body, a first modification layer inside the lens body, and a second modification layer on a surface of the lens body, where the first modification layer and the second modification layer are connected through the surface. The first modification layer and the second modification layer comprise a hydrophilic polymer so that the lens hydrophilicity is increased to improve the comfort of wearing. A thickness of the first modification layer from the surface of the lens body is sufficiently thin, thereby avoiding the deformation of the contact lens and increasing the uniformity of the modification layers.

Figure 1B:
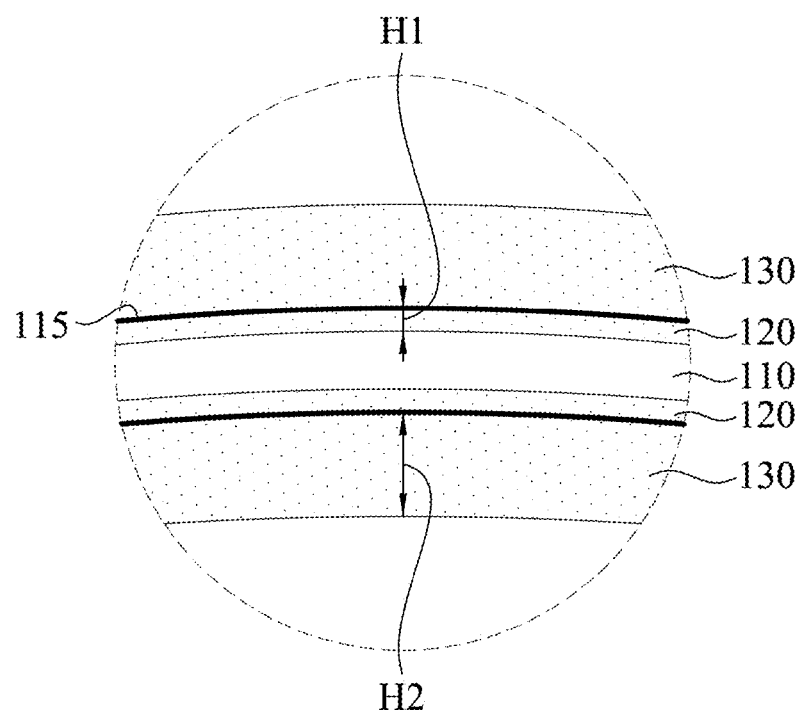
FIG. 1B is a partial enlargement view of the surface-modified contact lens in FIG. 1A.

According to some embodiments of the present disclosure, FIG. 1A illustrates a schematic cross-sectional view of the surface-modified contact lens 100, and FIG. 1B illustrates a partial enlargement view of the surface-modified contact lens 100 in FIG. 1A. The surface-modified contact lens 100 includes a lens body 110, a first modification layer 120 inside the lens body 110, and a second modification layer 130 on the lens body 110. In other words, the second modification layer 130 covers the surface 115 of the lens body 110. More specifically, the first modification layer 120 and the second modification layer 130 are connected through the surface 115. The first modification layer 120 includes a hydrophilic polymer, and the second modification layer 130 is grown from the first modification layer 120 to the outer side of the lens body 110. In other words, both the first modification layer 120 and the second modification layer 130 include the hydrophilic polymer increasing the hydrophilicity of the surface-modified contact lens 100. As the hydrophilicity of the surface-modified contact lens 100 is increased, the static contact angle (tested by water) of the surface-modified contact lens 100 is reduced. In some embodiments, the static contact angle of the surface-modified contact lens 100 may be in a range of 0° to 40°, such as 0.5°, 1°, 10°, 20°, 30°, or 40°.

In addition, a thickness H1 of the first modification layer 120 from a surface of the lens body 110 is in a range of 1 nm to 100 nm. In some preferred embodiments, the thickness H1 of the first modification layer 120 from a surface of the lens body 110 is in a range of 1 nm to 50 nm, such as 1 nm, 10 nm, 20 nm, 30 nm, 40 nm, or 50 nm. The thickness H1 of the first modification layer 120 is sufficiently thin that the first modification layer 120 is stopped in the superficial layer (within a depth about 100 nm from the surface) of the lens body 110. Therefore, the first modification layer 120 does not penetrate deeply into the lens body 110, and the deformation of the surface-modified contact lens 100 may be avoided. Moreover, the first modification layer 120 concentrated in the superficial layer of the lens body 110 may act as a unified start point for the growing of the second modification layer 130. As a result, the second modification layer 130 on the surface of the lens body 110 may have a uniformed thickness to improve the comfort of the surface-modified contact lens 100. As the uniformity of the second modification layer 130 is increased, the dynamic contact angle of the surface-modified contact lens 100 is reduced. In some embodiments, the dynamic contact angle of the surface-modified contact lens 100 may be in a range of 0° to 25°, such as 0.5°, 1°, 5°, 10°, 15°, 20°, or 25°.

Figure 2A:
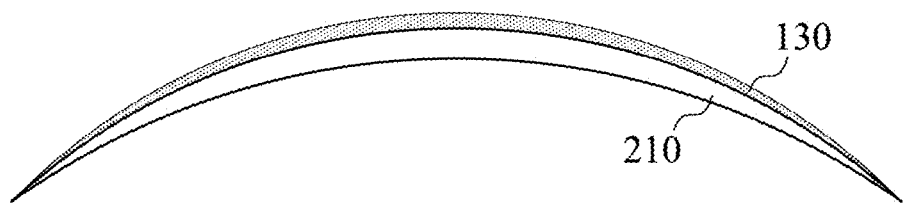
FIG. 2A is a schematic cross-sectional view of the surface-modified contact lens according to some embodiments of the present disclosure.
Figure 2B:
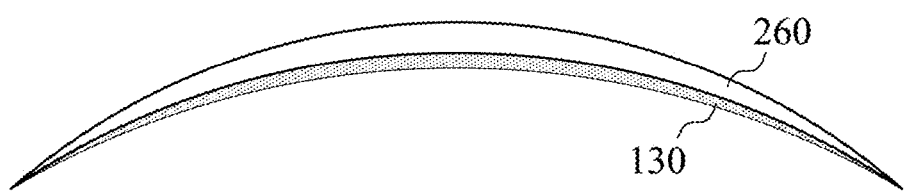
FIG. 2B is a schematic cross-sectional view of the surface-modified contact lens according to some other embodiments of the present disclosure.

In some embodiments, the second modification layer 130 on the outer side of the lens body 110 covers the surface of the lens body 110. More specifically, as shown in FIG. 1B, the second modification layer 130 may cover the front surface and the back surface of the lens body 110. FIG. 2A and FIG. 2B respectively illustrate the schematic cross-sectional view of the surface-modified contact lenses 200 and 250 similar to FIG. 1A, according to some other embodiments of the present disclosure. In some other embodiments, as shown in FIG. 2A, the second modification layer 130 may only cover the front surface of the lens body 210. In some other embodiments, as shown in FIG. 2B, the second modification layer 130 may only cover the back surface of the lens body 260. It should be noted that the front surface and the back surface of the lens body are relative terms and are not intended to limit the disclosure with specific examples. In some embodiments, a thickness H2 of the second modification layer 130 from the surface of the lens body 110 may be in a range of 1 nm to 100 μm, such as 1 nm, 0.1 μm, 1 μm, 10 μm, or 100 μm. In some preferred embodiments, the thickness H2 of the second modification layer 130 from the surface of the lens body 110 may be in a range of 1 nm to 100 nm.

Figure 3:
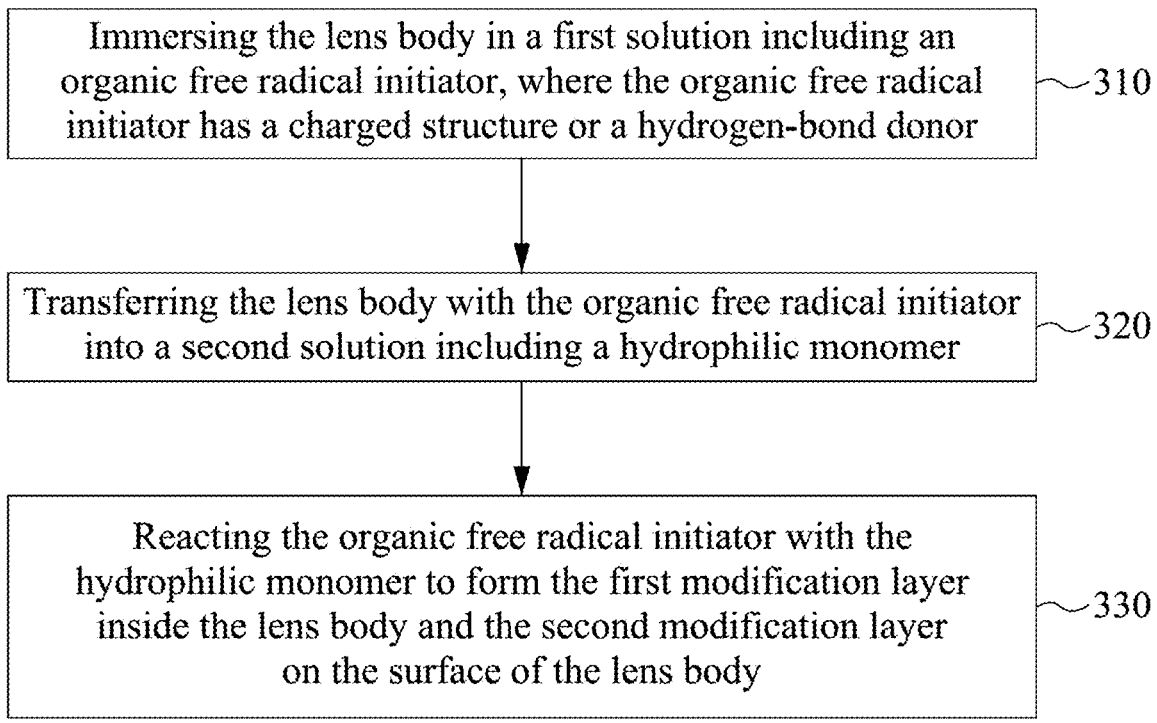
FIG. 3 is a flow diagram of a method of preparing the surface-modified contact lens according to some embodiments of the present disclosure.

According to some embodiments of the present disclosure, FIG. 3 illustrates a flow diagram of a method of preparing the surface-modified contact lens, such as the surface-modified contact lens 100 in FIG. 1A. In step 310, the lens body is immersed in a first solution including an organic free radical initiator. The organic free radical initiator has a charged structure or a hydrogen-bond donor and is absorbed by the lens body. In step 320, the lens body with the organic free radical initiator is transferred into a second solution including a hydrophilic monomer. In step 330, the organic free radical initiator is reacted with the hydrophilic monomer to form the first modification layer inside the lens body and the second modification layer on the surface of the lens body. Therefore, the surface-modified contact lens with modification layers is prepared. In the following description, the method of preparing the surface-modified contact lens is further described in details. It should be noted that additional operations may be performed before, during, or after the following operations, and these modifications are within the scope of the present disclosure.

In step 310, the lens body is immersed in the first solution including an organic free radical initiator, where the organic free radical initiator has a charged structure or a hydrogen-bond donor. For example, the lens body is immersed in the first solution for 30 minutes to sufficiently absorb the organic free radical initiator. In some embodiments, the lens body may include any suitable polymeric material known in the art. For example, the lens body may be a silicone lens body or non-silicone lens body without siloxane component. In other words, the method of preparing the surface-modified contact lens disclosed herein may also be referred as the method of modifying the surface of the polymeric material. More specifically, the lens body may include polymeric material such as silicone hydrogel, poly(2-hydroxyethyl methacrylate) (pHEMA), or polyurethane. For example, the lens body may include senofilcon A, falcon V, balafilcon A, somofilcon A, etafilcon A, hilafilcon B, ocufilcon D, or nelfilcon A.

The organic free radical initiator in the first solution is selected to be absorbed by the lens body and stopped in the superficial layer of the lens body. In other words, the organic free radical initiator absorbed by the lens body is concentrated in the lens body with a thickness no larger than 100 nm from the surface of the lens body. For example, the organic free radical initiator has a charged structure or a hydrogen-bond donor providing the interaction to stop the deeper penetration of the organic free radical initiator into the lens body.

In some embodiments, the organic free radical initiator with the charged structure may be an organic salt having the reactive portion for the radical generation, and its counterions for charge balance may be organic, inorganic, monatomic or polyatomic. The organic salt of the free radical is composed of an ionic assembly of cations and anions. The organic salt has numbers of positively charged ions (cations) and negatively charged ions (anions) in its chemical structure and the entire molecule is electrically neutral. For example, the positive charged structure of the organic free radical initiator may include quaternary ammonium salt (QAS), pyridinium salt, derivatives thereof, or combinations thereof. The negative charged structure of the organic free radical initiator may include —COO$^-$, —SO$_3^-$, —PO$_4^-$, derivatives thereof, or combinations thereof. In some embodiments, the organic free radical initiator with the hydrogen-bond donor may be a chemical structure characterized as A-H, where A is the heteroatom such as F, O, or N. The hydrogen-bond donor (A-H) may form a hydrogen bond as A-H . . . B with the hydrogen-bond acceptor (B) in the lens body, where B is the heteroatom such as F, O, or N. In one embodiment, the hydrogen-bond donor of the organic free radical initiator may be a functional group of azo. In some embodiments, the hydrogen-bond donor of the organic free radical initiator may include carboxyl group, amino group, hydroxyl group, or combinations thereof. For example, the hydrogen-bond donor of the organic free radical initiator may be a functional group of hydroxyl ketone. In some embodiments, the organic free radical initiator in the first solution may include 2,2'-Azobis(2-methylpropionamidine) dihydrochloride (AAPH), 4,4'-Azobis(4-cyanovaleric acid) (ACVA), 2,2'-Azobisisobutyric acid, 2,2'-Azobis[2-methyl-N-(2-hydroxyethyl)propionamide] (VA-086), 2-Hydroxy-4'(2-hydroxyethoxy)-2-methylpropiophenone (Irgacure 2959), 1-Hydroxy-Cyclohexylphenyl-ketone (PI-184), 2-Hydroxy-2-methylpropiophenone (HMPP), or combinations thereof.

In some embodiments, the first solution may be an aqueous solution with suitable concentration of the organic free radical initiator. For example, the first solution may include double-distilled water (ddH$_2$O) and the organic free radical initiator with the concentration in a range of 0.1 wt % to 20 wt %, such as 0.1 wt %, 0.2 wt %, 0.3 wt %, 0.5 wt %, 1 wt %, 1.5 wt %, 2 wt %, 4 wt %, 5 wt %, 8 wt %, 10 wt %, 15 wt %, or 20 wt %. In some preferred embodiments, the organic free radical initiator in the aqueous solution may be in a range of 0.1 wt % to 10 wt %. In some embodiments, the first solution may be an organic solution with suitable concentration of the organic free radical initiator. For example, the first solution may include isopropyl alcohol (IPA) and the organic free radical initiator with the concentration in a range of 0.1 wt % to 20 wt %. In some preferred embodiments, the organic free radical initiator in the organic solution may be in a range of 0.1 wt % to 10 wt %. If the concentration of the organic free radical initiator in the first solution is less than 0.1 wt %, the polymerization in the following process may take a lot of time. On the contrary, if the concentration of the organic free radical initiator exceeds 20 wt %, it will increase the cost too much.

In step 320, the lens body with the organic free radical initiator is transferred into the second solution including the hydrophilic monomer. The hydrophilic monomer in the second solution is selected to react with the organic free radical initiator in the lens body in the following process. For example, the hydrophilic monomer may have at least one vinyl group or ethynyl group to react with the organic free radical initiator, which allows the polymerization of the hydrophilic monomer. In some embodiments, the hydrophilic monomer may have the suitable molecular weight to penetrate into the lens body and react with the absorbed organic free radical initiator. Specifically, the molecular weight of the hydrophilic monomer may be in a range of 40 to 800 daltons. For example, the hydrophilic monomer in the second solution may include N,N-dimethylacrylamide (DMA), hydroxyethyl methacrylate (HEMA), 2-methacryloyloxyethyl phosphorylcholine (MPC), acrylamide, glycerol methacrylate (GMMA), hydroxypropyl methacrylate (HPMA), sulfobetaine methacrylate (SBMA), or combinations thereof.

In some embodiments, the second solution may further include a second monomer having a medicinal structure. In other words, portions of the chemical structure of the additional second monomer (or referred as the drug-capped monomer) may have known medicinal property. As a result, the modification layers formed of the hydrophilic monomer and the second monomer with the medicinal structure in the following process may include medicinal property. For example, the medicinal structure of the second monomer may include indomethacin, timolol, carteolol, betaxolol, levobunolol, metipranolol, dexamethasone, fluorometholone, hydrocortisone, prednisolone, rimexolone, diclofenac, ketorolac, pranoprofen, epinephrine, dipivefrin, brimonidine, apraclonidine, latanoprost, bimatoprost, unoprostone, pilocarpine, carbachol, demecarium bromide, echothiophate iodide, dorzolamide, brinzolamide, the like, or combinations thereof. In some embodiments, the additional second monomer having the medicinal structure may be Indomethacin 2-hydroxyethyl methacrylate (Indo-HEMA), dexamethasone methacrylate (Dex-MA), or combinations thereof.

More specifically, indomethacin 2-hydroxyethyl methacrylate was formed by the following process. Indomethacin, N,N'-diisopropylcarbodiimide, and 4-dimethylaminopyridine were dissolved in dichloromethane to form a mixture. 2-Hydroxyethyl methacrylate was slowly added into the mixture, and the mixture was reacted under the room temperature to obtain Indomethacin 2-hydroxyethyl methacrylate. On the other hand, dexamethasone methacrylate was formed by the following process. Methacrylic acid, N,N'-diisopropylcarbodiimide, and 4-dimethylaminopyridine were dissolved in dichloromethane to form a mixture. Dexamethasone was then added into the mixture cooled by an ice bath. The mixture was reacted under the room temperature to obtain dexamethasone methacrylate.

In some embodiments, the second solution may be an aqueous solution with suitable concentration of the hydrophilic monomer. For example, the second solution may include ddH2O and the hydrophilic monomer with the concentration in a range of 0.1 wt % to 30 wt %, such as 0.1 wt %, 1 wt %, 1.5 wt %, 2 wt %, 2.5 wt %, 4 wt %, 4.5 wt %, 5 wt %, 8 wt %, 10 wt %, 15 wt %, 20 wt %, 25 wt %, or 30 wt %. In some preferred embodiments, the hydrophilic monomer in the aqueous solution may be in a range of 1 wt % to 15 wt %. In some embodiments, the second solution may be an organic solution with suitable concentration of the hydrophilic monomer. For example, the second solution may include isopropyl alcohol (IPA) and the hydrophilic monomer with the concentration in a range of 0.1 wt % to 30 wt %. In some preferred embodiments, the hydrophilic monomer in the organic solution may be in a range of 1 wt % to 15 wt %. If the concentration of the hydrophilic monomer in the second solution is less than 0.1 wt %, the polymerization in the following process may take a lot of time. On the contrary, if the concentration of the hydrophilic monomer exceeds 30 wt %, it will increase the cost too much. It should be noted that the first solution and the second solution may both be aqueous solution. Therefore, the overall method of preparing the surface-modified contact lens may be processed in aqueous solutions to decrease the impact to the environment.

In step 330, the organic free radical initiator is reacted with the hydrophilic monomer to form the first modification layer inside the lens body. As the polymerization starts from the superficial layer of the lens body, the first modification layer grows toward the closer surface of the lens body. While the first modification layer reaches the surface of the lens body, the second modification layer starts to grow from the first modification layer to cover the surface of the lens body. As a result, the polymerization of the organic free radical initiator and the hydrophilic monomer forms the hydrophilic polymer which becomes the first modification layer inside the lens body and the second modification layer on the surface of the lens body. The first modification layer and the second modification layer improve the clinically important factors of the surface of the lens body without causing the deformation of the lens body, thus the surface-modified contact lens is well prepared.

In some embodiments, the reaction between the organic free radical initiator and the hydrophilic monomer may be activated by heating the second solution with the lens body. More specifically, the second solution with the lens body may be heated to a temperature between 30° C. and 140° C., such as 30° C., 40° C., 50° C., 60° C., 70° C., 80° C., 90° C., 100° C., 110° C., 120° C., 130° C., or 140° C. The duration of the heating may be different because of the different temperatures. For example, the second solution with the lens body may be heated to 70° C. for 2 to 5 hours or may be heated to 121° C. for 0.5 to 2 hours. In some embodiments, the reaction between the organic free radical initiator and the hydrophilic monomer may be activated by irradiating the second solution with the lens body. More specifically, the second solution with the lens body may be irradiated with a wavelength between 190 nm and 650 nm, such as ultraviolet (UV) with wavelength smaller than 400 nm. The duration of the irradiation may be different because of the different light sources. For example, the second solution with the lens body may be irradiated with UV light for 30 minutes.

The hydrophilic monomer in the second solution may improve the clinically important factors, such as hydrophilicity and lubricity, of the surface-modified contact lens after forming the hydrophilic polymer of the modification layers. In some embodiments, the lubricity of the surface-modified contact lens may be 1.5 to 3 times as high as that of the lens body without modification. For example, the lubricity of the surface-modified contact lens may be 6.0 while that of the lens body without modification is 2.0. Moreover, the modification layers with the selected hydrophilic polymer may improve the above mentioned factors without affecting other clinically factors, such as oxygen permeability. In some embodiments, the oxygen permeability of the surface-modified contact lens may be maintained after the modification process. For example, the oxygen permeability of the surface-modified contact lens may be 82.04 Dk while that of the lens body without surface-modification is 82.75 Dk.

Through the above mentioned process with separated two solutions, the surface-modified contact lens disclosed herein may have the following features. The organic free radical initiator selected for the first solution may be absorbed and stopped in the superficial layer of the lens body so that the following polymerization would start from the superficial layer. The modification layers formed from the superficial layer do not penetrate deeply into the lens body. Therefore, the deformation of the surface-modified contact lens may be avoided. In addition, the modification layers formed from the centralized position may lead to uniform thickness of the modification layers, which improves the comfort of wearing the surface-modified contact lens. On the other hand, the modification layers of the surface-modified contact lens also provide high hydrophilicity, lubricity, and oxygen permeability.

In the following description, the surface-modified contact lens of the present disclosure would undergo several measurements and evaluations. Referring to the examples herein, the features of the present disclosure would be described more specifically. However, the following mentioned examples are not intended to be limiting the present disclosure.

Example 1

A first solution was prepared as 0.5 wt % AAPH in ddH$_2$O. An unmodified senofilcon A lens body was immersed in the first solution for 0.5 hour. The lens body was transferred into a second solution prepared as 5 wt % DMA in ddH$_2$O. The second solution with the lens body was heated to 121° C. for 0.5 hour to form the surface-modified contact lens.

Example 2

A first solution was prepared as 2 wt % AAPH in ddH$_2$O. An unmodified senofilcon A lens body was immersed in the first solution for 0.5 hour. The lens body was transferred into a second solution prepared as 8 wt % acrylamide in ddH$_2$O. The second solution with the lens body was heated to 70° C. for 5 hours to form the surface-modified contact lens.

Example 3

A first solution was prepared as 0.5 wt % AAPH in ddH$_2$O. An unmodified senofilcon A lens body was immersed in the first solution for 0.5 hour. The lens body was transferred into a second solution prepared as 5 wt % acrylic acid in ddH$_2$O. The second solution with the lens body was heated to 121° C. for 0.5 hour to form the surface-modified contact lens.

Example 4

A first solution was prepared as 2 wt % AAPH in ddH$_2$O. An unmodified filcon V lens body was immersed in the first solution for 0.5 hour. The lens body was transferred into a second solution prepared as 8 wt % acrylamide in ddH$_2$O. The second solution with the lens body was heated to 70° C. for 5 hours to form the surface-modified contact lens.

Example 5

A first solution was prepared as 0.5 wt % AAPH in ddH$_2$O. An unmodified filcon V lens body was immersed in the first solution for 0.5 hour. The lens body was transferred into a second solution prepared as 1 wt % DMA/1 wt % acrylamide in ddH$_2$O. The second solution with the lens body was heated to 121° C. for 0.5 hour to form the surface-modified contact lens.

Example 6

A first solution was prepared as 0.5 wt % AAPH in ddH$_2$O. An unmodified filcon V lens body was immersed in the first solution for 0.5 hour. The lens body was transferred into a second solution prepared as 1 wt % acrylamide/1 wt % SBMA in ddH$_2$O. The second solution with the lens body was heated to 121° C. for 0.5 hour to form the surface-modified contact lens.

Example 7

A first solution was prepared as 0.5 wt % VA-086 in ddH$_2$O. An unmodified senofilcon A lens body was immersed in the first solution for 0.5 hour. The lens body was transferred into a second solution prepared as 4 wt % DMA/4 wt % MPC in ddH$_2$O. The second solution with the lens body was heated to 121° C. for 0.5 hour to form the surface-modified contact lens.

Example 8

A first solution was prepared as 4 wt % Irgacure 2959 in ddH$_2$O. An unmodified senofilcon A lens body was immersed in the first solution for 0.5 hour. The lens body was transferred into a second solution prepared as 4 wt % acrylamide in ddH$_2$O. The second solution with the lens body was irradiated with wavelength 365 nm for 0.5 hour to form the surface-modified contact lens.

Example 9

A first solution was prepared as 1 wt % PI-184 in IPA. An unmodified senofilcon A lens body was immersed in the first solution for 0.5 hour. The lens body was transferred into a second solution prepared as 4 wt % acrylamide in ddH$_2$O. The second solution with the lens body was heated to 121° C. for 0.5 hour to form the surface-modified contact lens.

Example 10

A first solution was prepared as 1 wt % PI-184 in IPA. An unmodified senofilcon A lens body was immersed in the first solution for 0.5 hour. The lens body was transferred into a second solution prepared as 4 wt % MPC/4 wt % DMA in ddH$_2$O. The second solution with the lens body was irradiated with wavelength 365 nm for 0.5 hour to form the surface-modified contact lens.

Example 11

A first solution was prepared as 1 wt % AAPH in ddH$_2$O. An unmodified senofilcon A lens body was immersed in the first solution for 0.5 hour. The lens body was transferred into a second solution prepared as 8 wt % DMA in ddH$_2$O. The second solution with the lens body was heated to 121° C. for 0.5 hour to form the surface-modified contact lens.

Example 12

A first solution was prepared as 0.5 wt % AAPH in ddH$_2$O. An unmodified etafilcon A lens body was immersed in the first solution for 0.5 hour. The lens body was transferred into a second solution prepared as 5 wt % DMA in ddH$_2$O. The second solution with the lens body was heated to 60° C. for 2 hours to form the surface-modified contact lens.

The transparencies of the above mentioned examples were measured by a transparency test. Specifically, the contact lens before surface-modification of the each example was placed in a UV-Vis spectrometer to measure its transparency under wavelengths of 380 nm to 780 nm. After the surface-modification, the surface-modified contact lens was placed in a UV-Vis spectrometer to measure its transparency under wavelengths of 380 nm to 780 nm again. The result shows that there is merely none difference between the transparency of the contact lens of the examples before and after surface-modification.

Figure 4B:
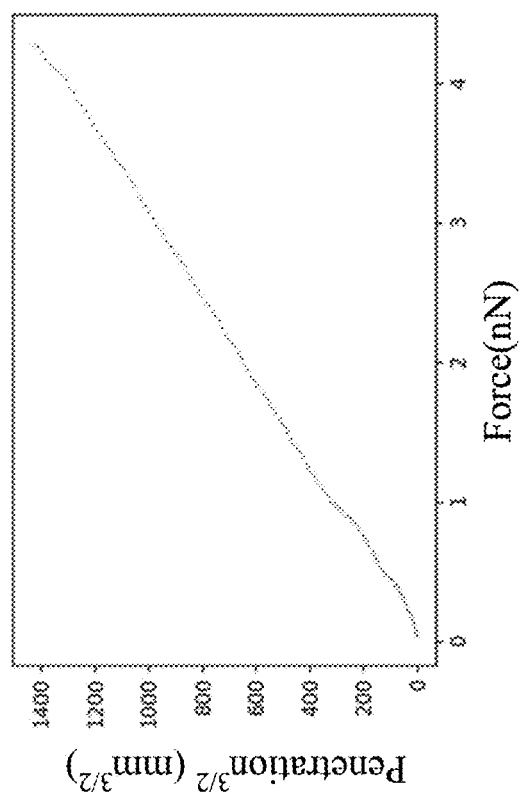
FIGS. 4A and 4B are atomic force microscope experiment results of the surface-modified contact lens according to one embodiment of the present disclosure.
Figure 4A:
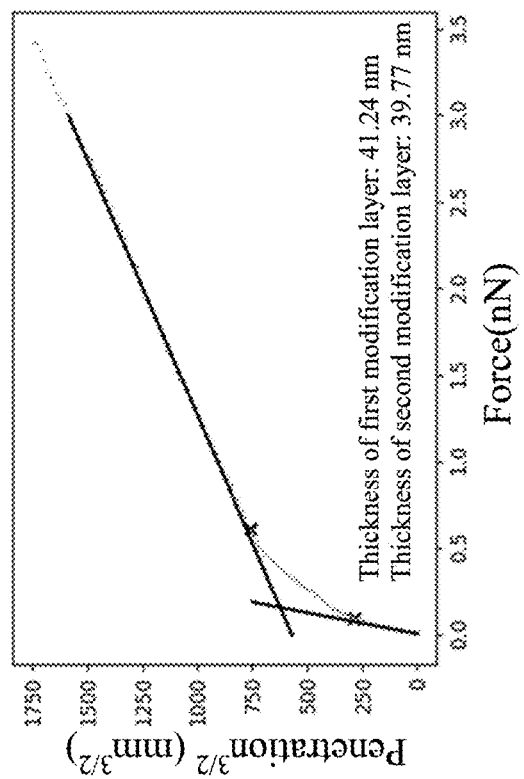

The thickness the first modification layer and the second modification layer of the above mentioned examples were measured by atomic force microscope (AFM). For example, FIG. 4A shows an AFM experiment result of the contact lens of Example 2 before the surface-modification, and FIG. 4B shows an AFM experiment result of the surface-modified contact lens of Example 2 after the surface-modification. As shown in FIG. 4A, no obvious change of the resulting slope of the contact lens is observed. In contrast, as shown in FIG. 4B, the resulting slope of the surface-modified contact lens changes twice. These slope differences respectively correspond to the overlap portion between the modification layer and the lens body and the modification layer on the surface of the lens body. Therefore, the thickness of the first modification layer (such as 41.24 nm for Example 2) and the thickness of the second modification layer (such as 39.77 nm for Example 2) are determined. The results of the thickness of the modification layer are listed in the Chart 1 below.

CHART 1

|  | Thickness of first modification layer (nm) | Thickness of second modification layer (nm) |
| --- | --- | --- |
| Example 1 | 43.38 | 21.71 |
| Example 2 | 41.24 | 39.77 |
| Example 3 | 30.73 | 28.27 |
| Example 4 | 67.47 | 30.28 |
| Example 5 | 32.73 | 26.90 |
| Example 6 | 18.02 | 18.81 |
| Example 7 | 7.25 | 16.80 |
| Example 8 | 25.66 | 30.81 |
| Example 9 | 27.33 | 34.06 |
| Example 10 | 19.61 | 40.47 |
| Example 11 | 4.86 | 7.49 |
| Example 12 | 20.10 | 37.22 |

Figure 5B:
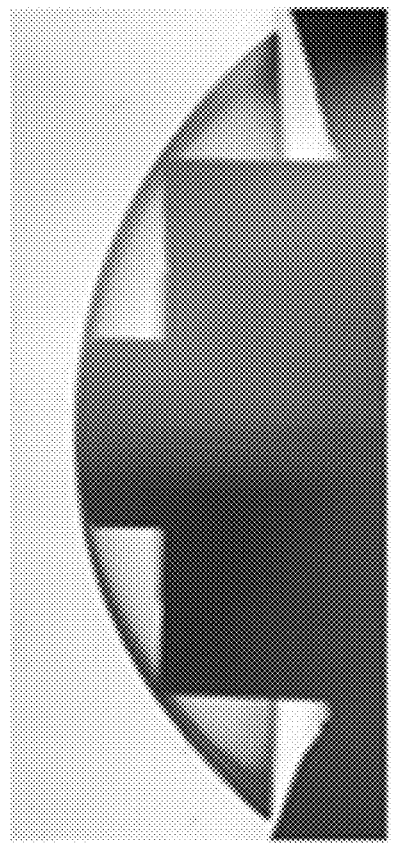
FIGS. 5A and 5B are experiment result images of the surface-modified contact lens according to one embodiment of the present disclosure.
Figure 5A:
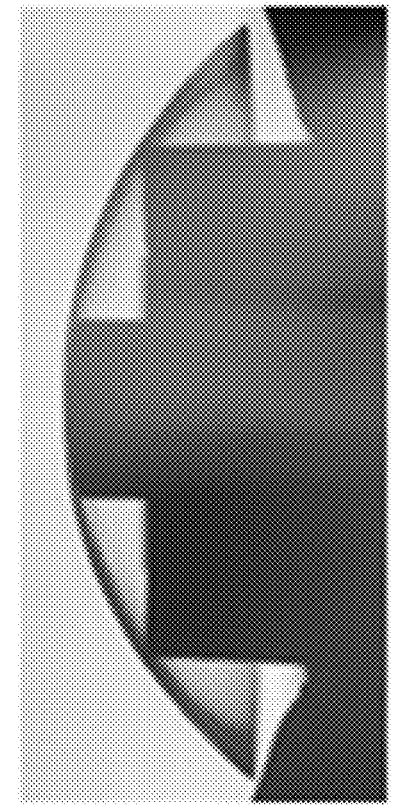

As shown in Chart 1, the thickness of the first modification layer from a surface of the lens body is in a range of 1 nm to 100 nm for each surface-modified contact lens of the examples. Therefore, the deformation of the surface-modified contact lens of the examples is avoided. FIG. 5A shows an experiment result image of the contact lens of Example 2 before the surface-modification, and FIG. 5B shows an experiment result image of the surface-modified contact lens of Example 2 after the surface-modification. The experiment result images were taken by the inspection instrument (Optimec JCF) to observe the appearance of the contact lens. As shown in FIGS. 5A and 5B, no obvious change is observed for the appearance of the surface-modified contact lens.

The static contact angle of the surface-modified contact lens of the above mentioned examples and the unmodified contact lens of controls 1 to 3 were determined, where the control 1 to 3 respectively represented senofilcon A, falcon V, and etafilcon A. Specifically, the static contact angle of the contact lens was determined by placing the contact lens on the slide glass, dripping water on the contact lens, and measuring the static contact angle by a contact angle meter.

In addition, the dynamic contact angle (DCA) of the surface-modified contact lens of the above mentioned examples and the unmodified contact lens of the controls 1 to 3 were determined by the captive bubble (CB) technique. Specifically, the contact lens was lowered into a buffered saline solution in a glass chamber and allowed to place on a submerged stand. An air bubble was formed at the tip of a curved needle positioned directly below the center of the contact lens. The needle was then moved toward the contact lens until the bubble made contact with the surface. A digital recording captured the bubble as it settled on the surface. This measurement process was repeated three times for each contact lens, and the average advancing and receding dynamic contact angle were calculated. For image analysis, an elliptical curve-fitting tool determined the contour of the contact lens front surface and the bubble. An automatic dynamic contact angle measurement at the lens-bubble interface was obtained from left and right sides of the bubble. The mean of these two angles was taken to represent the final dynamic contact angle. After calculating the advancing and receding dynamic contact angles and then the final dynamic contact angle was calculated. The results of the static contact angles and the dynamic contact angles are listed in the Chart 2 below.

CHART 2

|  | Static contact angle (°) | Dynamic contact angle (°) |
| --- | --- | --- |
| Example 1 | 13.0 | 3.0 |
| Example 2 | 6.4 | 2.0 |
| Example 3 | 35.9 | 5.7 |
| Example 4 | 14.8 | 2.2 |
| Example 5 | 27.6 | 2.1 |
| Example 6 | 11.2 | 1.5 |
| Example 7 | 27.9 | 2.5 |
| Example 8 | 31.8 | 5.6 |
| Example 9 | 21.5 | 2.6 |
| Example 10 | 21.9 | 1.7 |
| Example 11 | 8.8 | 3.9 |
| Example 12 | 2.5 | 1.2 |
| Control 1 | 83.5 | 26.5 |
| Control 2 | 88.4 | 31.3 |
| Control 3 | 74.5 | 38.0 |

As shown in Chart 2, the static contact angle is in a range of 0° to 40° for each surface-modified contact lens of the examples. On the contrary, the static contact angle is larger than 40° for each unmodified contact lens of the controls. Therefore, the hydrophilicity of the surface-modified contact lens is improved by the modification layers. Moreover, the dynamic contact angle is in a range of 0° to 25° for each surface-modified contact lens of the examples. The small dynamic contact angle indicates that the thickness of the modification layers is highly uniformed.

The lubricity of the surface-modified contact lens of the above mentioned examples and the unmodified contact lens of the controls 1 to 3 were determined. Specifically, the lubricity of the contact lens was determined by rubbing the contact lens with fingers and comparing the lubricity feeling between the examples and the controls.

In addition, the oxygen permeability of the surface-modified contact lens of the above mentioned examples and the unmodified contact lens of the controls 1 to 3 were determined by polarography. Specifically, the contact lens was immersed in phosphate buffered saline (PBS) solution and placed in a constant temperature and humidity chamber with 35° C. and 98% RH for at least 4 hours. Then, the contact lens was placed on a polarographic cell to measure the current. The uncalibrated oxygen permeability ($Dk_{preliminary}$) was calculated using formula 1 (as shown below), where t is the thickness of the lens body, I is the measured current, $I_d$ is the reference current, PA is the atmospheric pressure, and A is the area of the polarographic cell.

$$\left(\frac{Dk}{t}\right)_{preliminary} = \frac{(I - I_d)}{p_A \times A} \times 5.804 \times 10^{-2} \quad \text{(formula 1)}$$

This process was repeated at least four times with the contact lens having different thicknesses (for example, by stacking the contact lens). The final oxygen permeability ($Dk_{corrected}$) was calculated using the diagram illustrating the relationship of uncalibrated oxygen permeability and thickness of the lens body. The relationship was determined by the formula 2 (as shown below), where $D_{cathode}$ is the radius of the gold cathode of the polarographic cell.

$$\left(\frac{t}{Dk}\right)_{corrected} = \left(\frac{t}{Dk}\right)_{preliminary} \times \left[1 + \frac{(2.35 \times t)}{D_{cathode}}\right] \quad \text{(formula 2)}$$

The results of the lubricity and the oxygen permeability are listed in the Chart 3 below.

CHART 3

|  | Lubricity (no unit) | Oxygen permeability (Dk) |
|---|---|---|
| Example 1 | 4.0 | 71.2 |
| Example 2 | 5.0 | 79.6 |
| Example 3 | 3.5 | 75.1 |
| Example 4 | 5.0 | 83.9 |
| Example 5 | 4.0 | 83.0 |
| Example 6 | 6.0 | 80.9 |
| Example 7 | 4.0 | 56.4 |
| Example 8 | 3.5 | 68.8 |
| Example 9 | 4.5 | 62.5 |
| Example 10 | 4.0 | 71.4 |
| Example 11 | 5.5 | 70.9 |
| Example 12 | 5.5 | 23.4 |
| Control 1 | 2.0 | 56.2 |
| Control 2 | 2.5 | 80.1 |
| Control 3 | 2.5 | 23.8 |

As shown in Chart 3, the lubricity of the surface-modified contact lens is 1.5 to 3 times as high as that of the unmodified contact lens. For example, the lubricity of Example 1, 2, 7, and 9 are at least twice as high as that of Control 1, and the lubricity of Example 10 and 11 are at least 2.5 times as high as that of Control 1. Therefore, the lubricity of the surface-modified contact lens is improved by the modification layers. Moreover, the oxygen permeability of the surface-modified contact lens of the example is similar to that of the corresponding unmodified contact lens. This indicates that the oxygen permeability of the surface-modified contact lens is maintained even if the modification layers are formed on the surface and inside the lens body.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the present disclosure without departing from the scope or spirit of the disclosure. In view of the foregoing, it is intended that the present disclosure cover modifications and variations of this disclosure provided they fall within the scope of the following claims.

What is claimed is:

1. A surface-modified contact lens, comprising:
a lens body;
a first modification layer that is inside the lens body and directly contacts a first surface of the lens body; and
a second modification layer that is outside the lens body and extends from the first surface of the lens body, wherein the first modification layer and the second modification layer are connected through the first surface, the first modification layer and the second modification layer have a same composition that comprises a hydrophilic polymer, wherein a hydrophilic monomer used to form the hydrophilic polymer comprises N,N-dimethylacrylamide, hydroxyethyl methacrylate, 2-methacryloyloxyethyl phosphorylcholine, acrylamide, glycerol methacrylate, hydroxypropyl methacrylate, sulfobetaine methacrylate, or combinations thereof, and a thickness of the first modification layer extending from the first surface of the lens body toward an interior of the lens body is in a range of 1 nm to 100 nm.

2. The surface-modified contact lens of claim 1, wherein the lens body comprises silicone hydrogel, poly(2-hydroxyethyl methacrylate), or polyurethane.

3. The surface-modified contact lens of claim 1, wherein a thickness of the second modification layer from the first surface of the lens body is in a range of 1 nm to 100 μm.

4. The surface-modified contact lens of claim 1, wherein the first surface is covered by the second modification layer, and the first surface is a front surface or a back surface of the lens body.

5. The surface-modified contact lens of claim 1, wherein a dynamic contact angle of the surface-modified contact lens is in a range of 0° to 25°.

6. The surface-modified contact lens of claim 1, wherein a static contact angle of the surface-modified contact lens is in a range of 0° to 40°.

7. The surface-modified contact lens of claim 1, wherein the hydrophilic polymer further comprises a medicinal structure.

8. The surface-modified contact lens of claim 1, further comprising:
an additional first modification layer that is inside the lens body and directly contacts a second surface of the lens body; and
an additional second modification layer that is outside the lens body and extends from the second surface of the lens body, wherein the additional first modification layer and the additional second modification layer are connected through the second surface, and the additional first modification layer and the additional second modification layer have a same composition that comprises the hydrophilic polymer, and
wherein the first surface and the second surface is a front surface and a back surface of the lens body, respectively.

* * * * *